(12) United States Patent
Oswal et al.

(10) Patent No.: US 12,229,135 B2
(45) Date of Patent: Feb. 18, 2025

(54) WORKLOAD-AWARE DATA PLACEMENT ADVISOR FOR OLAP DATABASE SYSTEMS

(71) Applicant: Oracle International Corporation, Redwood Shores, CA (US)

(72) Inventors: Urvashi Oswal, Fremont, CA (US); Jian Wen, Hollis, NH (US); Farhan Tauheed, Zurich (CH); Onur Kocberber, Thalwil (CH); Seema Sundara, Nashua, NH (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 17/699,607

(22) Filed: Mar. 21, 2022

(65) Prior Publication Data

US 2023/0297573 A1    Sep. 21, 2023

(51) Int. Cl.
*G06F 16/2453* (2019.01)
*G06F 11/34* (2006.01)
(Continued)

(52) U.S. Cl.
CPC .... *G06F 16/24544* (2019.01); *G06F 11/3409* (2013.01); *G06F 16/211* (2019.01); *G06F 16/2282* (2019.01); *G06F 16/278* (2019.01)

(58) Field of Classification Search
CPC ............................................... G06F 16/24544
(Continued)

(56) References Cited

U.S. PATENT DOCUMENTS 10,489,215 B1    11/2019   Wen
10,554,738 B1    2/2020    Ren
(Continued)

OTHER PUBLICATIONS

Paiva, Joao, et al., "AutoPlacer: Scalable Self-Tuning Data Placement in Distributed Key-value Stores", 10th Intl Conf on Autonomic Computing (ICAC 13), pp. 119-131, USENIX Association, Jun. 2013, 13pgs.

(Continued)

*Primary Examiner* — Muluemebet Gurmu
(74) *Attorney, Agent, or Firm* — Hickman Becker Bingham Ledesma LLP

(57) ABSTRACT

Embodiments implement a prediction-driven, rather than a trial-driven, approach to automatic data placement recommendations for partitioning data across multiple nodes in a database system. The system is configured to extract workload-specific features of a database workload running at a database system and dataset-specific features of a database running on the database system. The workload-specific features characterize utilization of the database workload. The dataset-specific features characterize how data is organized within the database. The system identifies a plurality of candidate keys for determining how to partition data stored in the database across nodes. Based at least in part on the workload-specific features, the dataset specific features, and the plurality of candidate keys, a set of candidate key combinations for partitioning data is generated. Using a machine learning model, determine a particular candidate key combination that optimizes query execution performance benefit based on the workload-specific features and the dataset specific features. Generate data placement commands to allocate the database tables across the nodes.

20 Claims, 4 Drawing Sheets

(51) Int. Cl.
*G06F 16/21* (2019.01)
*G06F 16/22* (2019.01)
*G06F 16/27* (2019.01)

(58) Field of Classification Search
USPC .......................................................... 707/714
See application file for complete search history.

(56) References Cited

U.S. PATENT DOCUMENTS

| | | | |
|---|---|---|---|
| 10,606,649 | B2 | 3/2020 | Baggerman |
| 2010/0153956 | A1 | 6/2010 | Capps, Jr. |
| 2014/0006383 | A1* | 1/2014 | Hacigumus ....... G06F 16/24539 707/718 |
| 2015/0154255 | A1* | 6/2015 | Cole ................. G06F 16/24542 707/718 |
| 2016/0004621 | A1 | 1/2016 | Gongloor |
| 2017/0068675 | A1 | 3/2017 | Hazel |
| 2018/0096000 | A1* | 4/2018 | Harrison ............... G06F 16/288 |
| 2018/0107711 | A1 | 4/2018 | Tariq |
| 2019/0340095 | A1 | 11/2019 | Faibish |
| 2020/0034197 | A1 | 1/2020 | Nagpal |
| 2020/0125545 | A1* | 4/2020 | Idicula ................... G06N 20/20 |
| 2020/0125568 | A1 | 4/2020 | Idicula |
| 2021/0081453 | A1* | 3/2021 | Eadon ................... G06F 16/278 |

OTHER PUBLICATIONS

Breitbach, Martin, et al., "Context-Aware Data and Task Placement in Edge Computing Environments", 2019 IEEE Intl Conf on Pervasive Computing and Communctns (PerCom), pp. 1-10, https://doi.org/10.1109/PERCOM.2019.8767386, 2019, 10pgs.
Duan et al., "Tuning Database Configuration Parameters with iTuned", VLDB dated 2009, 12 pages.
Duggan, et al., 'Performance Prediction for Concurrent Database Workloads', p. 337-348, SIGMOD'11, Jun. 12-16, 2011, Athens, Greece, 12pgs.
Ganapathi, A. et al. "Predicting multiple performance metrics for queries: Better decisions enabled by machine learning", ICDE 2009, 12 pages.
Hilprecht, Benjamin, et al., "Learning a Partitioning Advisor with Deep Reinforcement Learning", https://doi.org/10.48550/arXiv.1904.01279, Apr. 2, 2019, 13pgs.
B. Debnath et al., SARD: A statistical approach for ranking database tuning parameters. In ICDEW, pp. 11-18, dated 2008.
Nehme, Rimma, et al., "Automated Partitioning Design in Parallel Database Systems", Proceedings of the 2011 ACM SIGMOD Intl Conf on Mgmt of Data, pp. 1137-1148, https://doi.org/10.1145/1989323.1989444, Jun. 12, 2011, 12pgs.
Zilio, D.C.A. "DB2 design advisor: integrated automatic physical database design" VLDB dated 2004, Proceedings of the Thirtieth international conference on Very large data bases, 11 pages.
Parchas, Panos, et al., "Fast and Effective Distribution-Key Recommendation for Amazon Redshift", Proceedings of the VLDB Endowment, https://doi.org/10.14778/3407790.3407834, 13(12), pp. 2411-2423, Jul. 1, 2020, 13pgs.
Pavlo, Andrew, et al., "Skew-aware automatic database partitioning in shared-nothing, parallel OLTP systems", Proceedings of the 2012 ACM SIGMOD Intl Conf on Mgmt of Data, pp. 61-72, https://doi.org/10.1145/2213836.2213844, May 20, 2012, 12pgs.
Rabl, Tilmann, et al., "Query Centric Partitioning and Allocation for Partially Replicated Database Systems", Proceedings of the 2017 ACM Intl Conf on Mgmt of Data, http://dx.doi.org/10.1145/3035918.3064052, pp. 315-330, May 14, 2017, 16pgs.
Reif et al., "Meta-learning for evolutionary parameter optimization of classifiers, Machine Learning", dated 2012, 24 pages.
Sullivan et al., "Using probabilistic reasoning to automate software tuning", In SIGmetrics, dated 2004, 13 pages.
Van Aken et al., "Automatic Database Management System Tuning Through Large-scale Machine Learning," Proceedings of the 2017 ACM International Conference on Management of Data, 2017, pp. 1009-1024.
Narayanan et al., "Continuous resource monitoring for self-predicting DBMS", IEEE International Symposium on Modeling, Analysis and Simulation of Computer and Telecommunication Systems, 2005, 10 pages.

\* cited by examiner

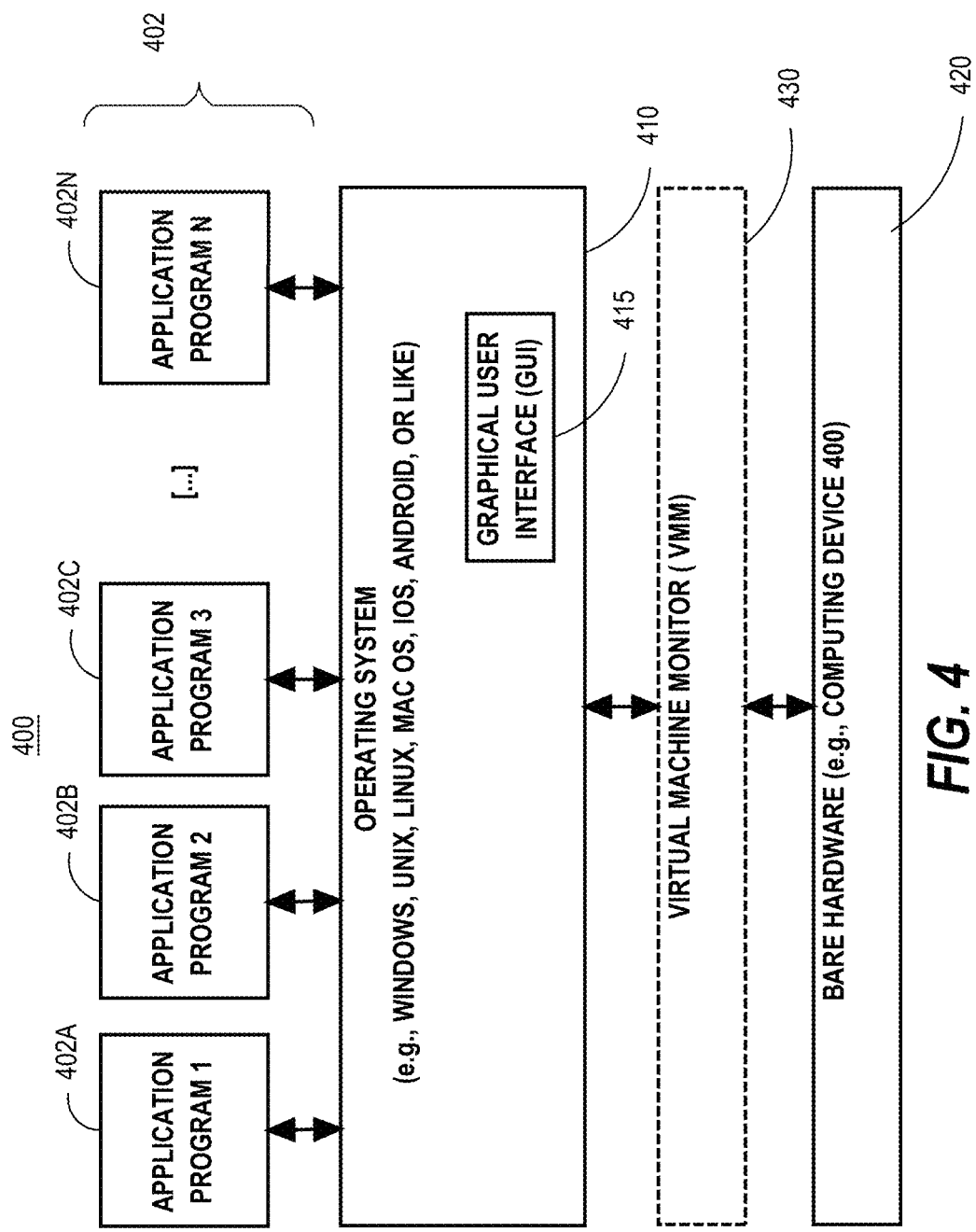

WORKLOAD-AWARE DATA PLACEMENT
ADVISOR FOR OLAP DATABASE SYSTEMS

FIELD OF THE INVENTION

The present invention relates to database system configuration and, more specifically, to automatic placement of database data across multiple nodes to optimize database performance for a given database workload.

BACKGROUND

Modern distributed database systems have a complex data processing architecture whose performance depends on many different factors. Distributed database systems accelerate processing of analytical queries by distributing query processing to multiple database nodes. By distributing the query processing, distributed database systems are able to scale performance of queries by using multiple nodes to process portions of the analytical query in parallel.

In order for distributed database systems to distribute query processing effectively, database data may be distributed across multiple nodes. For instance, database data may be partitioned in-memory horizontally across multiple nodes. If rows of tables participating in a join are co-located on the nodes, then query performance may improve significantly by avoiding the costs associated with redistributing data between nodes at query execution time.

However, determining data placement that facilitates optimization of query processing is not trivial task. For example, if the database data is partitioned in-memory horizontally across multiple nodes and rows of tables participating in a particular join operation are not co-located on a particular node, then the database management system (DBMS) may have to redistribute data among nodes prior to executing the particular join operation, thereby causing additional processing overhead. Data placement techniques may rely on several factors such as workload mix, size of database tables, network bandwidth, and data skew. Additionally, the number of candidate data placements may grow exponentially based on the number of existing tables and attributes. Existing techniques for determining optimal data placement have largely focused on either using cost-estimates and heuristics or using post-execution logs.

Cost-estimates and heuristics may be used to determine how to partition existing tables across multiple nodes. However, cost-estimates and heuristics are predictions and may not accurately represent how the data is accessed and/or updated as the cost-estimates and heuristics do not incorporate real execution times from historical or real-time query history.

Another strategy for optimizing data placement is to use post-execution logs to determine how to distribute data across multiple nodes. Post-execution logs contain a history of executed database operations and how well each operation performed. However, using post-execution logs to determine optimal data placement generally involves the process of adaptively trying different combinations of data placement and recording performance of each data placement strategy to determine their effectiveness. This approach unfortunately becomes quite expensive to perform as it involves several iterations of data placement and tracking performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 4 depicts a software system that may be used in an embodiment.

DETAILED DESCRIPTION

Figure 1:
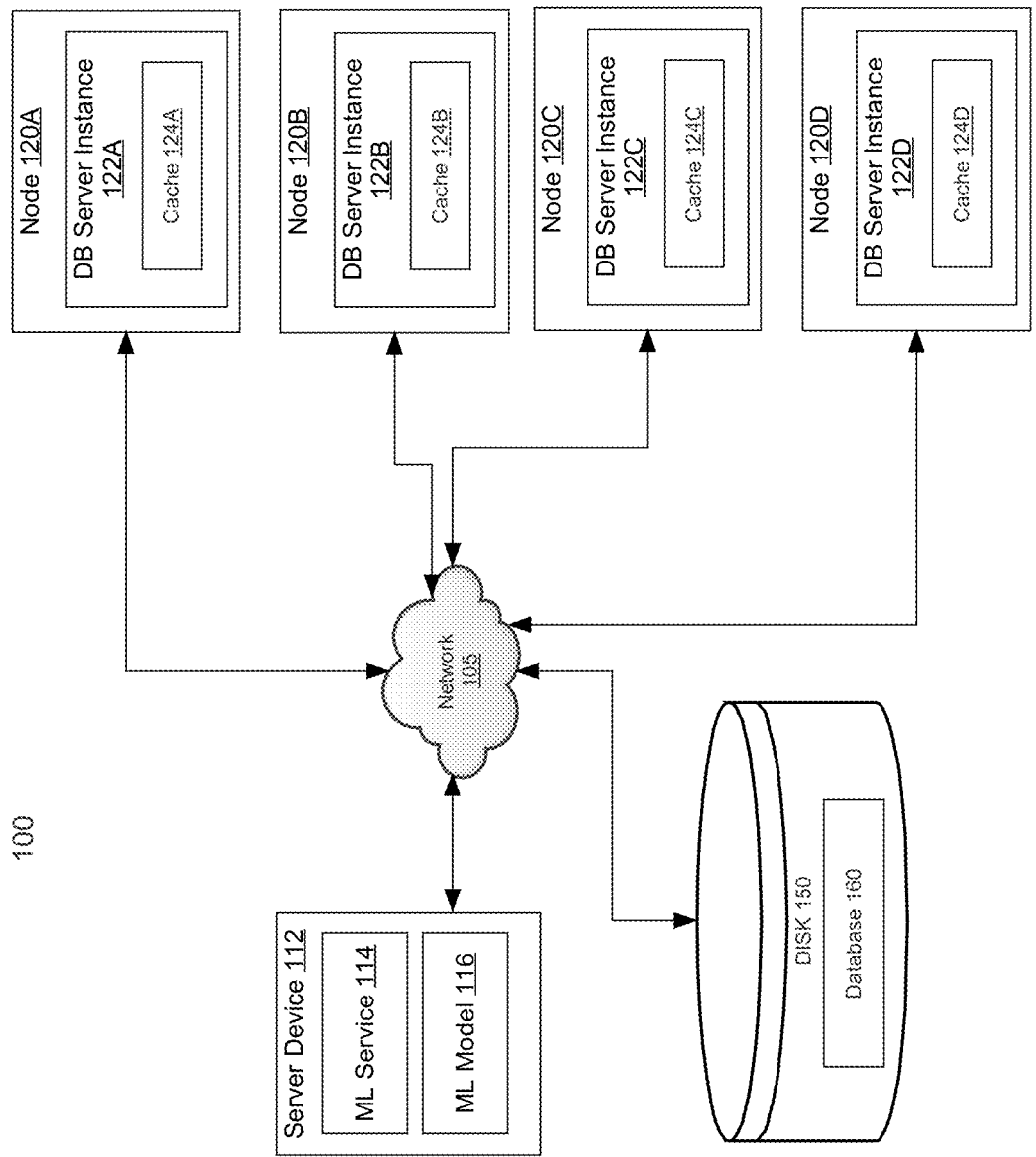
FIG. 1 is a block diagram that depicts a database management system, according to one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments implement a prediction driven approach to automatically determine optimal data placement across nodes in a distributed database system. The prediction driven approach implements a machine learning (ML) model to identify a plurality of candidate keys used to determine how to partition data across multiple database nodes. Candidate keys may represent a set of columns from database tables that may be used in specific database operations including, but not limited to, table joins and group-by operations. By identifying candidate keys that are likely to be part of future database join and group-by operations, the ML model may optimize how data is partitioned in order to reduce the costs of redistributing data between nodes at query execution time. Specifically, the ML model is trained using a large corpus that includes a wide variety of workload conditions and a wide variety of datasets to simulate different types and varieties of datasets stored on different database configurations based on different workload conditions. The ML model is trained to select a set of candidate keys to be the basis for partitioning the database across multiple nodes.

In an embodiment, workload-specific features and dataset specific features are extracted from a database running on a database system. Workload-specific features characterize the utilization of a database and may include, but are not limited to, query execution times, network latency, lists of tables included in join and group by operations, join attributes and keys, and actual and heuristic-estimated sizes of data transferred over the network for each join and group by operation. Dataset specific features characterize how data is organized within a database and may include, but not limited to, table cardinality, data partition placement types such as round-robin, hashing, or using specific data placement keys, and the number of distinct values in database columns.

In an embodiment, a plurality of candidate keys are identified for determining how to partition data stored in the database across two or more nodes in the DBMS. The plurality of candidate keys may include keys identified from executed join and group by operations. A set of data placement candidates may be generated based on the workload-specific features, the dataset-specific features, and the identified plurality of candidate keys. Each data placement candidate in the set of data placement candidates contains a combination of candidate keys that may be used to determine how to partition the database tables across the two or more nodes.

In an embodiment, the ML model may be used to determine a particular data placement candidate, from the set of data placement candidates, that optimizes query execution performance when the database is partitioned across nodes according to the data placement candidate. For each particular data placement candidate, the ML model predicts a performance benefit by comparing the existing performance of database operations to a predicted performance of database operations if data partitioning was based on the particular data placement candidate. Performance benefits are calculated for each of the data placement candidates in the set of data placement candidates. The ML model may provide the data placement candidate that provides optimal performance benefits for the database. In an embodiment, one or more data placement commands to partition tables of the database across the nodes may be generated based upon the provided data placement candidate.

The described ML model implements a prediction-based approach that does not require live trials on the DBMS. Specifically, the ML model does not require running queries repeatedly to test performance of different data placement combinations. Thereby avoiding the cost of repartitioning tables for each key combination along with the costs associated with repeatedly executing test queries.

Structural Overview

FIG. 1 is a block diagram that depicts a database management system (DBMS), according to one or more embodiments. The DBMS 100 depicted includes nodes 120A, 120B, 120C, and 120D, disk 150, and server device 112 communicatively connected via network 105. Although four nodes are depicted in the present illustration, in other embodiments, DBMS 100 may comprise fewer or more nodes. Network 105 may be any type of network that provides communications, exchanges information, and/or facilitates the exchange of data between components of the DBMS 100. For instance, network 105 may represent one or more local area networks (LANs), wide area networks (WANs), metropolitan area networks (WANs), or any other network implemented to facilitate data exchange between the components of the DBMS 100.

Each of the nodes 120A, 120B, 120C, and 120D have access to the same database 160. For the purposes of illustration, database 160 is shown as stored on a single shared disk 150, but in alternative embodiments database 160 may be spread across multiple disks to which each of the nodes 120A, 120B, 120C, and 120D have access.

In an embodiment, each of the nodes 120A, 120B, 120C, and 120D include a multi-core processor connected to main volatile memory via a bus (not shown). Each of the multi-core processors for nodes 120A, 120B, 120C, and 120D are connected to a local cache. For example, the nodes 120A, 120B, 120C, and 120D contain cache 124A, 124B, 124C, and 124D, respectively. In an embodiment, each of the caches 124A, 124B, 124C, and 124D may comprise L1 or L2 cache, or a scratchpad memory. Scratchpad memory may refer to a fast-access memory that is electronically coupled to a coprocessor. Nodes 120A-120D each represent a server device implemented to run a database server instance. DB server instance 122A, 122B, 122C, and 122D represent database server instances of a database running in the DBMS. While in the illustrated embodiment each node is executing a single database server instance, in alternative embodiments, a single node may execute more than one database server instance.

In an embodiment, server device 112 may represent a computing device, such as a server computer, implemented to execute ML service 114. ML service 114 represents a computer process or program configured to implement the ML model 116, receive input for the ML model 116, and provide data placement instructions based on the output from the ML model 116 to the nodes 120A, 120B, 120C, and 120D. The ML service 114 may be implemented in any number of ways, including as a stand-alone application running on server device 112, web services running on server device 112, etc. Embodiments of the ML service 114 described herein, may be comprised of a combination of software, and allocated of resources from the server device 112. Specifically, an application is a combination of integrated software components and an allocation of computational resources, such as memory, and/or processes on the computing device for executing the integrated software components on a processor, the combination of the software and computational resources being dedicated to performing the stated functions of the application.

In an embodiment, the ML model 116 is implemented to receive as input a set of data placement candidates and workload-specific features that are specific to database 160. The ML model 116 computes a performance benefit for each data placement candidate in the set of data placement candidates and recommends a data placement candidate that has the highest performance benefit based on the provided workload-specific features for database 160. In an embodiment, the ML model 116 may implemented as a linear regression model. In other embodiments, the ML model 116 may implement decision trees, neural networks, or any other machine-learning technique.

Training the Machine Learning Model

According to an embodiment, the ML model 116 is trained using a corpus of datasets. The corpus of datasets may contain a plurality of datasets with varying dataset properties. For instance, each of the datasets may vary based on table cardinality, the number of distinct values in each of the columns, and data placement types such as round robin or specific data placement keys. By having a wide variety of dataset shapes, the corpus of datasets provide better generalization and, in turn, result in a trained machine learning model that is able to provide predictions for any type of dataset.

In an embodiment, database workload samples are generated for the corpus of datasets to train the ML model 116. A database workload refers to a dataset being managed by a particular DBMS, and the nature and frequency of queries being run over the dataset. Training samples may be based on transaction processing and database benchmarks provided by the Transaction Processing Performance Council (TPC). The TPC includes benchmarks such as TPCH and TPCDS with different scale factors, referring to the raw data size such as 1 TB, 2 TB, 4 TB, 8 TB, 30 TB, and so on. TPC benchmark based queries may be run on different system setups with varying number of nodes. For instance, the TPC benchmark based queries may be run on a system provisioned with a number of nodes corresponding to the target database system.

In another embodiment, workload samples may be automatically generated for a given dataset. For instance, hundreds of workload variations may be systematically generated to generate a performance prediction dataset for the ML model 116. The automatically generated workloads may be a combination of both randomly generated and explicitly specified queries.

In an embodiment, the ML model 116 is trained using each of the executed workload samples on each of the datasets in the corpus. By executing the workload samples on each of the datasets, each dataset in the corpus will have sufficient performance information about the performance dimensions. For example each sample dataset will have dataset-specific features and workload-specific features. In an embodiment, the dataset specific features may include, but are not limited to, table cardinality, data placement partitioning strategies, and a number of distinct values in a column. Data placement partitioning may refer to horizontal partitioning strategies including, but are not limited to, round-robin partitioning, range partitioning, list partitioning, and hash partitioning. In an embodiment, the workload-specific features may include, but are not limited to, query execution times, network latency, lists of tables included in join and group by operations, join attributes and keys, and actual and heuristic-estimated sizes of data transferred over the network for each join and group by operation.

The dataset-specific features and the workload-specific features for each dataset are used to train the ML model 116. In an embodiment, the ML model 116 is trained using a dataset sample, M, from the corpus with performance targets being defined by workload-specific features for the dataset sample, such as query execution times and network performance values.

In an embodiment, the ML model 116 may be configured to receive as input: a set of data placement candidates, which each represent different combinations of candidate keys to be used for determining table partitioning and workload-specific features that are specific to database 160.

Data Placement Candidates

As described, the ML model 116 receives as input a set of data placement candidates and workload specific feature data for database 160. The set of data placement candidates represent different combinations of candidate keys for horizontal table partitioning of the tables in database 160. Horizontal table partitioning is a partitioning strategy in which each partition of a table maintains the same table schema. That is, each partition maintains the same number of columns. The table is partitioned based on the rows in the table. Horizontal table partitioning may be based on values within a specific column, such as partitioning rows based on different values in the primary key column. One strategy for horizontal partitioning is to partition rows of the table based on join and/or group by key columns. Partitioning table data by join and group by key columns may improve query performance by avoiding costs associated with redistributing data among nodes at query execution time.

In an embodiment, candidate keys are based on join and group by key columns that are identified by analyzing the query history of queries executed on database 160. For example, query plans and post execution logs for database 160 may be analyzed to determine which key columns were used to execute join and group by operations for queries executed on database 160. Data placement candidates represents the possible combinations of candidate keys for determining how to horizontally partition table data within database 160. The data placement candidates may contain combinations of key columns used in a join or group by operation identified from the query history. In another embodiment, candidate keys may also include primary keys from each table in database 160 along with each key column used in a join or group by operation identified from the query history.

In an embodiment, the ML service 114 may be configured to generate new data placement candidates by selecting a combination of one candidate key per table in database 160. For example, if a database contains the following tables:

Table A: {PK-A, Col-2A, Col-3A}
Table B: {PK-B, Col-2B, Col-3B}
Table C: {PK-C, Col-2C, Col-3C} where PK-A, PK-B, PK-C represent primary keys and Col-2A, Col-2B, Col-2C represent key columns used in join and group by operations. Data placement candidates for tables A, B, and C include combinations of key columns from the set of join and group by key columns and primary keys which include {PK-A, PK-B, PK-C, Col-2A, Col-2B, Col-2C}. A sample data placement candidate for partitioning may be {PK-A, Col-2B, Col-2C}. Other data placement candidates may include any other combinations of key columns from the set of join, group by, and primary keys.

The above example is simplistic example with limited tables and columns. However, databases generally have more tables and columns which may result in a larger set of key columns. As a result, the number of data placement candidates may grow exponentially with the increased number of tables and keys participating in join and group by operations. In order to mitigate exponential growth of the set of data placement candidates, data placement keys may be pruned based on join sizes and data skew.

Join and group by operations generally cause data to be distributed between nodes or replicated across nodes. Depending upon the size of the two tables being joined, the data distributed or replicated over the nodes may cause a performance impact to the underlying query due to network latency caused by the data distribution or replication. If however, the two tables being joined are relatively small, then the overall performance impact for data distribution or data replication may be minimal. Data placement candidates that contain key column combinations from keys based on smaller joins may not provide a significant performance benefit and may not be worth evaluating using the ML model 116. In an embodiment, a join size minimum threshold may be implemented to remove key columns identified from join and group by operations that cause minimal network latency from either data distribution or replication across nodes. For example, an $i^{th}$ join operation pairs two tuples from two relations of size $S_1^i$ and $S_2^i$. During execution of the join operation, depending on the data placement, the relations may be either distributed or replicated to each of the nodes. The cost for data distribution may be represented as:

$$D_i := S_1^i + S_2^i$$

where $D_i$ represents the size of data sent over the network for the join operation during data distribution. The cost for replicating data across all nodes for the particular join operation requires that the smaller relation be replicated across the nodes, resulting in a data size represented as:

$$R_i := \min(S_1^i, S_2^i) * \text{num\_nodes}$$

where $R_i$ represents the size of data replicated over the network to the nodes and num_nodes represents the number of nodes in the DBMS 100. Based on the two cost equations above, the size of the data sent over the network for the particular join would be at least:

$$J_i := \min(D_i, R_i)$$

where $J_i$ is the size of the data sent over the network for the particular join, which equals a minimum of either, $D_i$, the size of data sent over the network for data distribution or $R_j$, the size of data sent over the network for replicating one of the relations across the nodes.

In an embodiment, a minimum data size threshold may be implemented to eliminate smaller sized join and group by operations which may not yield a significant performance benefit by optimizing data placement across nodes. For example, a join size threshold α may be configured to eliminate smaller sized joins such that only joins above the α threshold ($J_i > α$) are considered when determining the potential key columns for data placement candidates. A similar threshold may be implemented for group by operations.

In an embodiment, key columns in join and group by operations that result in significant data skew may be removed from consideration as potential key columns for data placement candidates. Data skew occurs when there is non-uniform data distribution in a dataset and may result in poor load balancing across nodes and higher query execution times. For example, if the number of distinct values in a key column is less than the number of nodes in the cluster then the key column will lead to skewed data placement. The number of distinct values for a composite key of columns may be evaluated as:

$$\min(NDV) < \mu * \text{num\_nodes}$$

where min(NDV) is the minimum number of distinct values for the key columns in the composite key and μ represents a threshold factor value to account for hash collisions. The μ may be configurable, for instance by default μ may be set to 0.8. That is, if one of the key columns in a composite key has a number of distinct values that is less than the threshold value, then the composite key is eliminated from consideration as a data placement key.

In an embodiment, composite keys that contain duplicate columns may be removed from consideration as potential key columns for data placement candidates. For example, if the DBMS 100 implements an in-memory query accelerator such as HeatWave, then composite keys that contain duplicates may not be used.

The following example illustrates how pruning candidate keys, which do not significantly improve query execution performance, from the set of data placement candidates may improve the efficiency of the ML model 116.

| Dataset and size | All possible Data Placement Candidates | Data Placement Candidates after Pruning |
|---|---|---|
| TPCH 1 T | 120 | 90 |
| TPCDS 1 T | 752,716,800 | 2592 |
| TPCDS 30 T | 311,850,000 | 7776 |

For example, in the above table the TPC-DS benchmark model has 23 base tables and 99 queries. The "TPCDS 1 T" benchmark with 1 terabyte of data has 752,716,800 possible data placement candidates. After implementing the pruning techniques described the possible data placement candidates is reduced to 2592. Similarly, the "TPCDS 30 T" benchmark with 30 terabytes of data has 311,850,000 possible data placement candidates. After implementing the pruning techniques described the possible data placement candidates is reduced to 7776.

In some embodiments, the pruning techniques may not significantly reduce the total number of data placement candidates. Without limiting the total number of data placement candidates, the input set of data placement candidates provided to the ML model 116 may become quite large and as a result the ML model 116 may take a significant amount of time to calculate a recommendation for data placement. In order to reduce the total number of data placement candidates provided to the ML model 116, a max combination threshold may be implemented, where the max combination threshold ensures that the size of the input set of data placement candidates is limited to a set amount. For example, the max combination threshold may be set to 10,000 by default, which would ensure that the ML model 116 would calculate data placement recommendations in a fixed amount of time.

Machine Learning Model

In an embodiment, the ML model 116 is implemented to receive as input a set of data placement candidates and workload-specific features that are specific to database 160. The ML model 116 computes a performance benefit for each data placement candidate in the set of data placement candidates and recommends a data placement candidate that has the highest performance benefit based on the provided workload-specific features for database 160.

In an embodiment, the workload-specific features are provided to the ML model 116 by the ML service 114 in the form of sets of feature vectors for join and group by operations. Each set of feature vectors may include, but are not limited to, query execution times, a list of join and group by tables, join attributes and keys, types, network times, query compute times, and actual and heuristic-estimated sizes of data transferred over the network for each join and group by. For example, one set of feature vectors may be specific to join operations performed and another set of feature vectors may be specific to group by operations.

In an embodiment, the ML model 116 is implemented to predict a performance benefit for each data placement candidate by calculating a summation of predicted network and compute times for every join and group by operation in the input workload and subtracting the summation of predicted network and compute times from the actual execution times provided in the workload-specific features. For example, input into the ML model 116 includes a new data placement candidate $DP_i$ and extracted workload feature vectors $W_{join}$ and $W_{gby}$. Workload feature vector $W_{join} = \{j_1, j_2, \ldots, j_m\}$ represents workload features associated with each join captured in the workload history. Workload feature vector $W_{gby} = \{g_1, g_2, \ldots, g_n\}$ represents workload features associated with each group by operation captured in the workload history. The following algorithm A illustrates how a performance benefit is calculated for each data placement candidate $DP_i$:

```
S = 0
For j_k in W_join do:
    f_k ← [j_k, DP_i]        (feature extraction)
    S ← S + R_join(f_k)      (model inference)
For g_k in W_gby do:
    f_k ← [g_k, DP_i]        (feature extraction)
    S ← S+ R_gby(f_k)        (model inference)
Return S
``` where S is the total performance benefit for data placement candidate $DP_i$.

The ML model 116 first iterates through each join operation in the feature vector set $W_{join}$ and determines the feature vector, $f_k$, for a specific join operation $j_k$ and the $DP_i$. The feature vector, $f_k$, is provided as input into the ML model 116, represented as $R_{join}$. The $R_{join}(f_k)$ model function calculates a performance benefit for data placement candidate $DP_i$ with respect to the join operation $j_k$. At the model inference step, the performance benefit, S, is calculated as a summation of the performance benefits of each join operation represented in $W_{join}$.

The ML model 116 next iterates through each group by operation in the feature vector set $W_{gby}$ and determines the feature vector, $f_k$, for a specific group by operation $g_k$ and the $DP_i$. The feature vector, $g_k$, is provided as input into the ML model 116, represented as $R_{gby}$. The $R_{gby}(f_k)$ model function calculates a performance benefit for data placement candidate $DP_i$ with respect to the group by operation $g_k$. At the model inference step, the performance benefit, S, is calculated as a summation of the performance benefits of each group by operation represented in $W_{gby}$.

The ML model 116 repeats the above calculations for each data placement candidate in the set of data placement candidates, $DP_{candidates}$. Upon determining the performance benefit for each DP in $DP_{candidates}$ based on the join and group by feature vectors, ML model 116 recommends the data placement candidate that has the highest expected performance benefit. In an embodiment, the following algorithm B describes selection of the data placement candidate that has the highest expected performance benefit for workload W. Input for the algorithm includes the current data placement DP* of database 160 across nodes 120A-120D, the set of candidate data placements $DP_{candidates}$, and workload logs $W^* = \{q_1, q_2, \ldots, q_M\}$ which represent the actual queries executed in the workload on database 160.

---

$W_{join} \leftarrow \emptyset$, $W_{gby} \leftarrow \emptyset$, $S^* = 0$, $DP_{new} = \emptyset$
For $q_k$ in $W_*$ do:
    $W_{join}{}^k \leftarrow$ Extract features for all joins in query $q_k$
    $V_{gby}{}^k \leftarrow$ Extract features for all group by in query $q_k$
    $W_{join} \leftarrow W_{join}{}^k$ (Sum each $W_{join}{}^k$ into $W_{join}$)
    $W_{gby} \leftarrow W_{gby}{}^k$ (Sum each $W_{gby}{}^k$ into $W_{gby}$)
For $DP_i$ in $DP_{candidates}$:
    $S_i \leftarrow$ (Estimated performance benefit for $DP_i$ from Algorithm A)
    If $S^* > S_i$
        $DP_{new} \leftarrow DP_i$
        $S^* \leftarrow S_i$
Return $DP_{new}$, $S^*$

--- where the output of algorithm B is $DP_{new}$, which represents the recommended data placement, and $S^*$, which represents the estimated performance benefit for $DP_{new}$.

In algorithm B, ML model 116 iterates through workload logs $W^*$, where for each query $q_k$ the ML model 116 extracts features for joins in query $q_k$ and stores in $W_{join}{}^k$, extracts features for group by in query $q_k$ and stores in $W_{gby}{}^k$, aggregates the join features $W_{join}{}^k$ for all queries into $W_{join}$, and aggregates the group by features $W_{gby}{}^k$ for all queries into $W_{gby}$.

The ML model 116 determines which data placement candidate in the set of candidate data placements $DP_{candidates}$ provides the highest expected performance benefit. The ML model 116 iterates through each $DP_i$ in $DP_{candidates}$ and compares the estimated performance benefit $S_i$ to the current estimated performance benefit $S^*$. If the estimated performance benefit $S_i$ for $DP_i$ is greater than the current estimated performance benefit $S^*$, then the ML model 116 sets the new value of $S^*$ to $S_i$ and sets the recommended data placement $DP_{new}$ to equal $DP_i$. After iterating through each of the data placement candidates and determining the data placement candidate with the highest expected performance benefit, the ML model 116 outputs $DP_{new}$, $S^*$, which represents the recommended data placement and its estimated performance benefit.

Processing Overview

Figure 2:
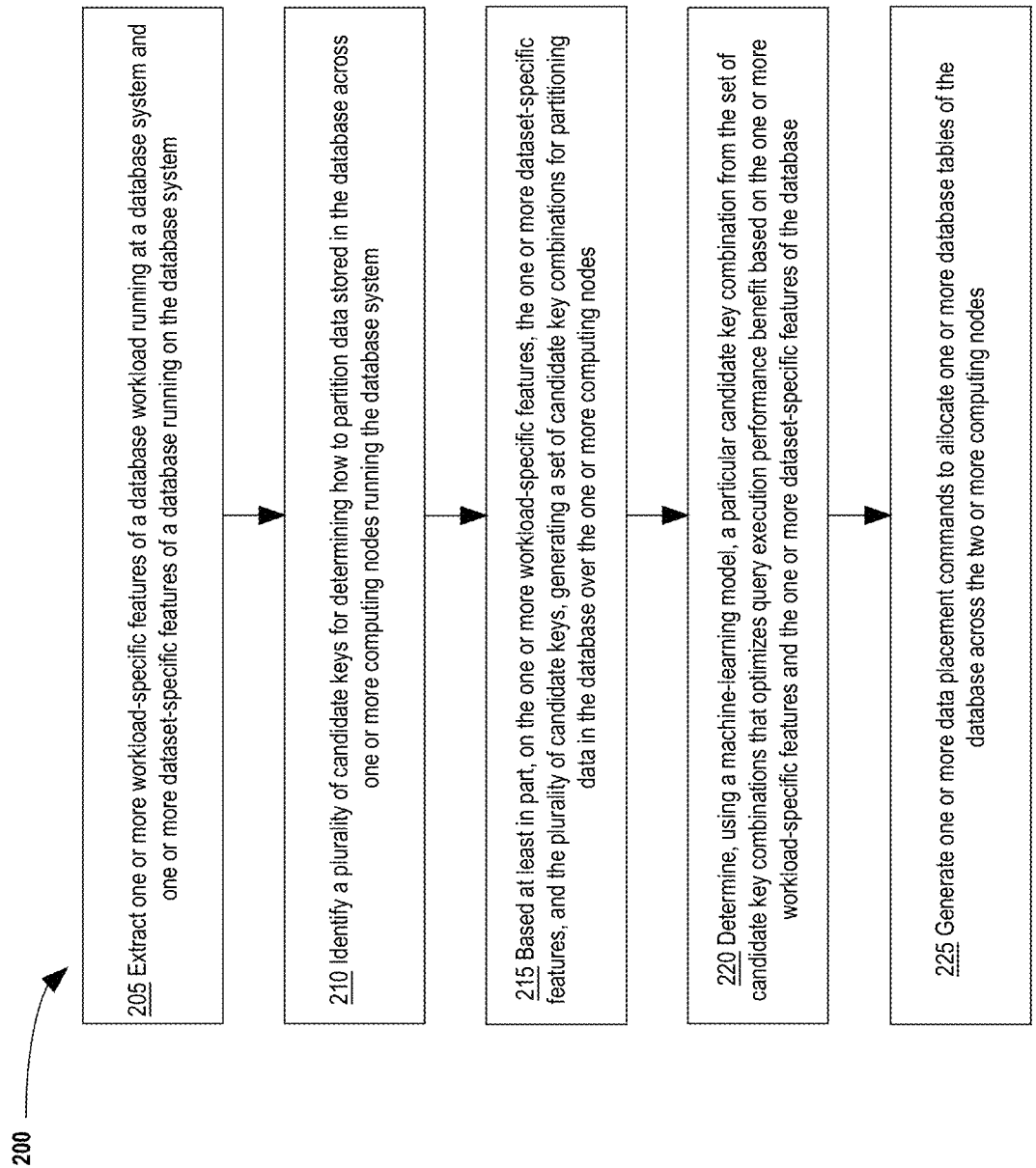
FIG. 2 depicts flowchart for automatically generating data placement commands to partition one or more database tables of a database across two or more nodes, according to one or more embodiments.

FIG. 2 depicts flowchart 200 for automatically generating data placement commands to partition one or more database tables of a database across two or more nodes. At step 205 of flowchart 200, one or more workload-specific features of a database workload running at a database system and one or more dataset-specific features of a database running on the database system are extracted. The one or more workload-specific features of the database workload characterize cpu/memory/network utilization of the database workload. The one or more dataset-specific features of the database characterize how data is organized within the database running on the database system. For example, the ML service 114 may extract the one or more workload-specific features and the one or more dataset-specific features from database 160.

At step 210 of flowchart 200, a plurality of candidate keys are identified for determining how to partition data stored in the database across two or more computing nodes running on the database system. In an embodiment, the ML service 114 may retrieve query plans and post execution logs from database 160 to identify which key columns were used to execute join and group by operations for queries executed on database 160. The key columns from the join and group by operations may make up the plurality of candidate keys.

At step 215 of flowchart 200, a set of candidate key combinations for partitioning data in the database over the two or more computing nodes is generated based at least in part on the one or more workload-specific features, the one or more dataset-specific features, and the plurality of candidate keys. In an embodiment, the ML service 114 may generate a set of data placement candidates, where each data placement candidate represents a candidate key combination of candidate keys for each table in database 160. Each data placement candidate represents one combination of candidate keys that may be used to partition database data across nodes 120A-120D.

At step 220, a machine-learning model is used to determine a particular candidate key combination from the set of candidate key combinations that optimizes query execution performance benefit based on the one or more workload-specific features and the one or more dataset-specific features of the database. In an embodiment, the ML service 114 may send input, which includes a set of data placement candidates and workload-specific features that are specific to database 160, to the ML model 116. The ML model 116 computes a performance benefit for each data placement candidate in the set of data placement candidates and recommends a data placement candidate that has the highest performance benefit based on the provided workload-specific features for database 160.

At step 225, one or more data placement commands to allocate one or more database tables across two or more nodes is generated. In an embodiment, the ML service 114, upon receiving the data placement candidate that has the highest performance benefit from the ML model 116, generates one or more data placement commands that may be executed by the DBMS 100 in order to redistributed database data across nodes 120A-120D according to the recommended data placement candidate.

In an embodiment, the ML service 116 may be configured with a performance benefit threshold that represents a minimum performance benefit value that the performance benefit of the data placement candidate must exceed in order to generate the one or more data placement commands for repartitioning the database data. The performance benefit threshold may be used to filter out recommendations that only provide a minor performance benefit when compared to the computation cost of repartitioning the database tables.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
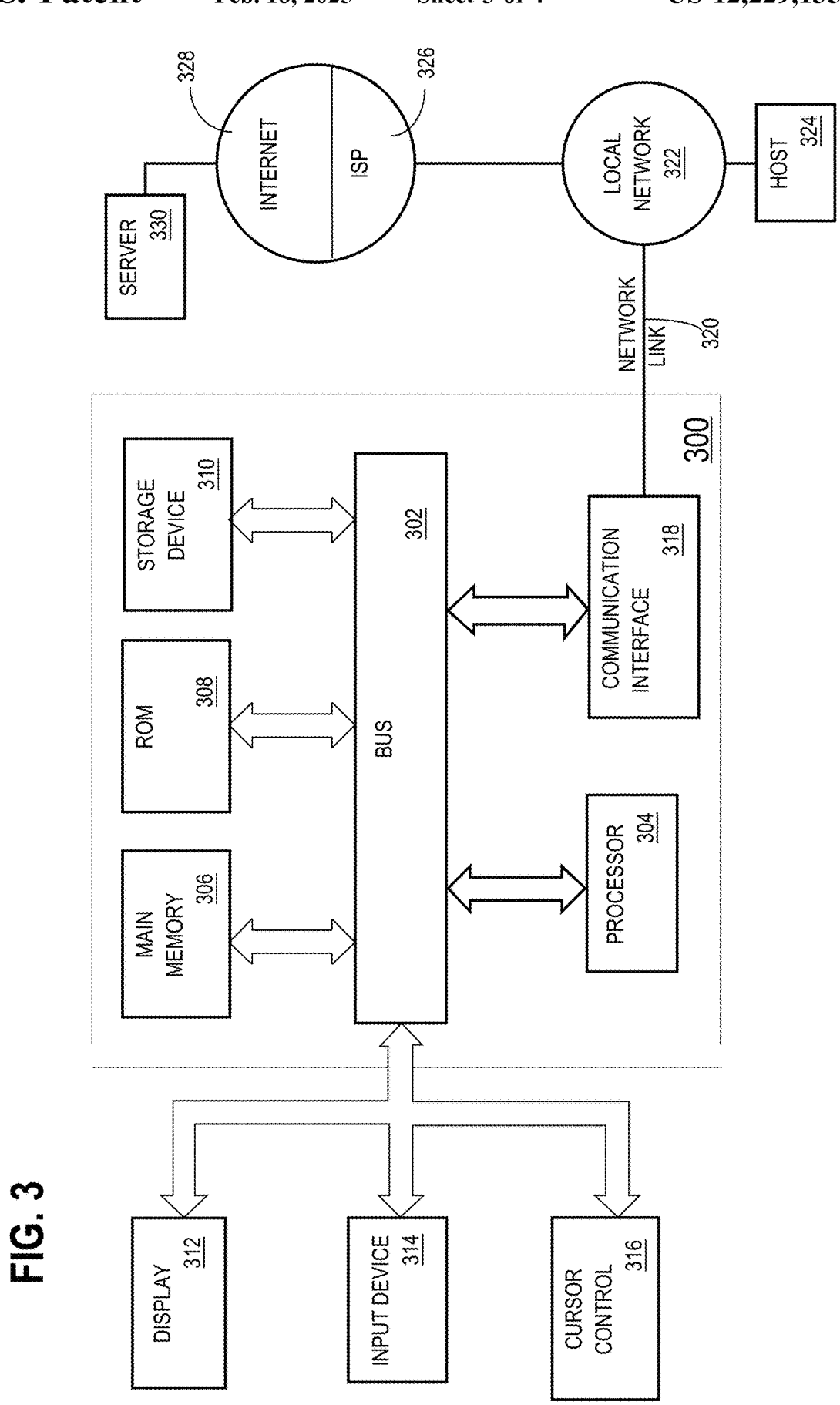
FIG. 3 depicts a computer system that may be used in an embodiment.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

FIG. 4 is a block diagram of a basic software system 400 that may be employed for controlling the operation of computer system 400. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 400. Software system 400, which may be stored in system memory (RAM) 406 and on fixed storage (e.g., hard disk or flash memory) 410, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 410 into memory 406) for execution by the system 400. The applications or other software intended for use on computer system 400 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 404) of computer system 400. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 400.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 400 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   extracting one or more workload-specific features of a database workload running at a database system and one or more dataset-specific features of a database running on the database system;
   wherein the one or more workload-specific features of the database workload characterize resource utilization of the database workload;
   wherein the one or more dataset-specific features of the database characterize how data is logically organized within the database running on the database system;
   identifying a plurality of candidate keys for determining how to partition data stored in the database across two or more computing nodes running the database system;
   based at least in part, on the one or more workload-specific features, the one or more dataset-specific features, and the plurality of candidate keys, generating a set of candidate key combinations for partitioning data in the database over two or more computing nodes;
   determining, using a machine-learning model, a particular candidate key combination from the set of candidate key combinations that optimizes query execution performance benefit based on the one or more workload-specific features and the one or more dataset-specific features of the database; and
   generating one or more data placement commands to allocate one or more database tables of the database across the two or more computing nodes.

2. The method of claim 1, wherein the one or more workload-specific features comprise at least one of: query execution times, a list of join tables, a list of group by tables, join attributes of tables, join keys for each table, table types, network compute times, actual size of data transferred over a network for each join operation and each group by operation, and heuristic-estimated size of data transferred over the network for each of the join operations and each of the group by operations.

3. The method of claim 1, wherein the one or more dataset-specific features comprise at least one of: table cardinality, data placement type, actual number of distinct values in each column of the tables in the database, and estimated number of distinct values in each column of the tables in the database.

4. The method of claim 1, further comprising, prior to identifying the plurality of candidate keys, receiving database execution logs for the database running on the database system;
   wherein the database execution logs are post-execution logs comprising executed queries on the data system and their associated query plans; and
   wherein the associated query plans include candidate keys from sets of join keys for each join operation and sets of group by keys for each group by operation.

5. The method of claim 4, wherein the plurality of candidate keys represent at least one of a join key from a join operation recorded in the database execution logs, and a group by key from a group by operation recorded in the database execution logs.

6. The method of claim 1, wherein the machine-learning model is a linear regression model.

7. The method of claim 1, further comprising training the machine-learned model using a training corpus with data representing a plurality of different database workloads, including a plurality of different workload-specific features, a plurality of different dataset-specific features, a plurality of different database schemas, and a plurality of performance metrics associated with the plurality of different database workloads.

8. The method of claim 1, wherein determining the particular candidate key combination from the set of candidate key combinations comprises, for each candidate key combination in the set of candidate key combinations:
calculating a first performance benefit for join operations based on a particular data placement, wherein the particular data placement is based upon the candidate key combination;
calculating a second performance benefit for group by operations based on the particular data placement; and
aggregating the first performance benefit and the second performance benefit to generate an overall performance benefit for the candidate key combination.

9. The method of claim 8, further comprising:
determining the particular candidate key combination from the set of candidate key combinations that has the highest overall performance benefit.

10. The method of claim 1, further comprising pruning a subset of candidate key combinations, from the set of candidate key combinations, that have join sizes below a minimum join size threshold.

11. The method of claim 1, further comprising pruning a subset of candidate key combinations, from the set of candidate key combinations, that cause a skew of data that is above a data skew threshold.

12. The method of claim 1, further comprising executing the one or more data placement commands to cause partitioning of data in the one or more database tables of the database and loading the partitioned data into the two or more computing nodes.

13. One or more non-transitory computer-readable media storing instructions which, when executed by one or more processors, cause:
extracting one or more workload-specific features of a database workload running at a database system and one or more dataset-specific features of a database running on the database system;
wherein the one or more workload-specific features of the database workload characterize resource utilization of the database workload;
wherein the one or more dataset-specific features of the database characterize how data is logically organized within the database running on the database system;
identifying a plurality of candidate keys for determining how to partition data stored in the database across two or more computing nodes running the database system;
based at least in part, on the one or more workload-specific features, the one or more dataset-specific features, and the plurality of candidate keys, generating a set of candidate key combinations for partitioning data in the database over the two or more computing nodes;
determining, using a machine-learning model, a particular candidate key combination from the set of candidate key combinations that optimizes query execution performance benefit based on the one or more workload-specific features and the one or more dataset-specific features of the database; and
generating one or more data placement commands to allocate one or more database tables of the database across the two or more computing nodes.

14. The one or more non-transitory computer-readable media of claim 13, wherein the one or more workload-specific features comprise at least one of: query execution times, a list of join tables, a list of group by tables, join attributes of tables, join keys for each table, table types, network compute times, actual size of data transferred over a network for each join operation and each group by operation, and heuristic-estimated size of data transferred over the network for each of the join operations and each of the group by operations.

15. The one or more non-transitory computer-readable media of claim 13, wherein the one or more dataset-specific features comprise at least one of: table cardinality, data placement type, actual number of distinct values in each column of the tables in the database, and estimated number of distinct values in each column of the tables in the database.

16. The one or more non-transitory computer-readable media of claim 13 storing additional instructions which, when executed by the one or more processors, further cause:
prior to identifying the plurality of candidate keys, receiving database execution logs for the database running on the database system;
wherein the database execution logs are post-execution logs comprising executed queries on the data system and their associated query plans; and
wherein the associated query plans include candidate keys from sets of join keys for each join operation and sets of group by keys for each group by operation.

17. The one or more non-transitory computer-readable media of claim 16, wherein the plurality of candidate keys represent at least one of a join key from a join operation recorded in the database execution logs, and a group by key from a group by operation recorded in the database execution logs.

18. The one or more non-transitory computer-readable media of claim 13 storing additional instructions which, when executed by the one or more processors, further cause training the machine-learned model using a training corpus with data representing a plurality of different database workloads, including a plurality of different workload-specific features, a plurality of different dataset-specific features, a plurality of different database schemas, and a plurality of performance metrics associated with the plurality of different database workloads.

19. The one or more non-transitory computer-readable media of claim 13, wherein determining the particular candidate key combination from the set of candidate key combinations comprises, for each candidate key combination in the set of candidate key combinations:
calculating a first performance benefit for join operations based on a particular data placement, wherein the particular data placement is based upon the candidate key combination;
calculating a second performance benefit for group by operations based on the particular data placement; and
aggregating the first performance benefit and the second performance benefit to generate an overall performance benefit for the candidate key combination.

20. The one or more non-transitory computer-readable media of claim 19 storing additional instructions which, when executed by the one or more processors, further cause:

determining the particular candidate key combination from the set of candidate key combinations that has the highest overall performance benefit.

* * * * *